Patented June 15, 1943

2,321,896

UNITED STATES PATENT OFFICE 2,321,896

COPOLYMERS OF p-CHLOROSTYRENE

Edgar C. Britton and Walter J. Le Fevre, Midland, Mich., assignors to The Dow Chemical Company, Midland, Mich., a corporation of Michigan No Drawing. Application November 8, 1939, Serial No. 303,448

7 Claims. (Cl. 260—86)

This invention relates to certain new synthetic resinous materials, and in particular concerns the co-polymers of p-chlorostyrene,

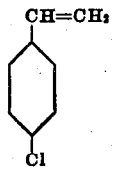

and certain unsaturated ethers and esters.

It is known that p-chlorostyrene is capable of undergoing polymerization to form a clear, transparent, resinous polymer which is soluble in benzene and other aromatic hydrocarbon solvents. Although such polymerized product possesses a number of properties, e. g. good dielectric properties, resistance to attack by acids and alkalies, impermeability to moisture, excellent scratch hardness, etc., which render it a desirable material for the manufacture of molded or shaped articles, it has the serious disadvantage of being unusually brittle. When attempt is made to prepare molded objects of polymerized p-chlorostyrene by ordinary compression or injection-molding technique, the moldings are so brittle that it is seldom possible to remove them from the molding die without breakage. For this reason polymerized p-chlorostyrene has heretofore found very little use as a commercial molding material.

We have now found that the co-polymers of p-chlorostyrene and certain unsaturated esters and ethers are much less brittle than pure polymerized p-chlorostyrene and at the same time retain to a large extent many of the above-mentioned valuable properties of the latter material. All of such new co-polymers are clear, transparent solids which vary in solubility from products readily soluble in aromatic solvents such as benzene, toluene, xylene, etc., to products which are substantially insoluble, but swell to varying degrees, when contacted with such solvents. They may be molded or otherwise shaped by conventional procedure to obtain hard, glass-like objects which display very little tendency to blush or discolor upon aging. They possess good dielectric properties and are adapted for use as, or in, electrical insulators. They are also adapted to a variety of other uses, such as the preparation of varnishes, lacquers, paints and other coating compositions, films and foils, impregnating compositions, laminations, etc.

The unsaturated ester nad ether co-polymerizing agents employed in preparing the new products are characterized in that they contain at least two ethylenic linkages. It is believed that during polymerization, at least two of the ethylenic bonds of the unsaturated ester or ether react with the ethylenic bond of the p-chlorostyrene, resulting in the formation of a cross-linked chain type of polymeric structure. The invention is not limited, however, by any theory herein proposed as to the structure of the new co-polymers. A preferred class of co-polymerizing agents consists of (1) the neutral unsaturated mono- and poly-carboxylic acid esters of unsaturated alcohols, e. g. allyl cinnamate, dillyl maleate, 2-chloroallyl crotonate, methallyl acrylate, crotyl methacrylate, allyl vinylacetate, dimethallyl fumarate, etc.; (2) the neutral saturated poly-carboxylic acid esters of unsaturated alcohols, e. g. diallyl oxalate, di-(2-chloroallyl) adipate, dimethallyl succinate, dicrotyl malonate, etc.; and (3) the neutral esters of unsaturated acids and polyhydric alcohols, e. g. ethylene di-cinnamate, the de-crotonate of 1.4-dioxanediol-2.3, ethylene di-crotonate, etc. Such esters are ordinarily prepared by any of the well-known methods for the production of esters from alcohols and acids.

The new co-polymers are prepared by mixing a minor proportion of the unsaturated ester or ether co-polymerizing agent with monomeric or partially polymerized p-chlorostyrene and thereafter subjecting the mixture to polymerizing conditions. The polymerization may be carried out in any of the known ways, e. g. by polymerizing directly in the presence or absence of added agents, such as solvents, accelerating agents, non-thermoplastic fillers, emulsifiers, plasticizing agents, modifying agents, resins, gums, dyes, pigments, etc., but the properties and form of the co-polymer products may vary considerably with changes in the conditions of polymerization. For example, the polymerization may be carried out in the presence of an aromatic solvent, such as benzene or toluene, to produce the co-polymer in the form of a gel which may be precipitated as a fine powder by addition of a non-solvent liquid such as ethanol. Similarly, the mixture of p-chlorostyrene and co-polymerizing agent may be emulsified and thereafter polymerized to obtain a translucent co-polymer which is somewhat softer than the product prepared by direct co-polymerization. The variable conditions having greatest influence on the properties of the co-polymer, however, are the proportion of co-polymerizing agent and the temperature of polymerization.

The proportions of co-polymerizing agent and p-chlorostyrene may be varied between wide limits, but the solubility of the product in aromatic solvents and/or its tendency to swell when contacted with such solvents usually decrease as the proportion of co-polymerizing agent is increased. Ordinarily, however, we prefer to employ between about 0.001 and about 0.25 part by weight of co-polymerizing agent per part of p-chlorostyrene, although the exact proportion required to form a co-polymer of given properties depends somewhat upon the particular co-polymerizing agent employed, since certain of the co-polymerizing agents appear to be more reactive than others.

Polymerization of a liquid mixture of p-chlorostyrene and the co-polymerizing agent takes place very slowly on standing in the dark at room temperature and, accordingly, such liquid mixture may be prepared and thereafter shipped in closed containers to the ultimate consumer where it may be polymerized in any desired manner. The mixture may be stabilized against polymerization by light or moderately elevated temperatures by the addition of a polymerization inhibitor such as quinone, trinitrobenzene, etc.

Because of the low rate at which a mixture of p-chlorostyrene and a co-polymerizing agent of the present class polymerizes, it is preferable to accelerate the polymerization by the use of heat, actinic light, or an accelerating agent such as benzoyl peroxide, ozone, strong mineral acid, etc. The polymerization is usually carried out by heating the mixture of p-chlorostyrene and co-polymerizing agent to a temperature between about 50° C. and about 180° C., although higher or lower temperatures may be employed if desired. The polymerization may be further accelerated by the use of a small proportion, e. g. 0.1 to 0.5 per cent by weight, of an accelerating agent such as benzoyl peroxide, ozone, etc. Considerable heat is evolved during the initial part of the polymerization, and, when operating on a large scale, it is advantageous to provide heat-dissipating means in order to maintain the desired temperature. If desired, polymerization may be initiated at a relatively low temperature, e. g. 50° C., and the temperature gradually increased as polymerization proceeds.

The polymerization may be stopped at an intermediate point or continued to completion to obtain a number of products varying in such characteristics as molecular weight, solubility, physical appearance, etc. When the polymerization is carried out at elevated temperatures using little or no accelerating agent, it may be interrupted merely by cooling the mixture to room temperature or thereabouts, after which further polymerization is not noticeable.

The solid co-polymers are usually obtained in a form suitable for molding or other use without further purification, but if an especially refined product is desired, the initial product may be ground, extracted with a solvent, such as acetone or ethanol, to remove any unpolymerized material and thereafter dried. If the co-polymer is capable of being swelled by solvents, it may be dispersed in a swelling solvent and then precipitated in finely divided form by addition of a non-solvent liquid such as ethanol. As in the case of polymerized p-chlorostyrene, the physical and electrical properties, e. g. hardness, impact strength, power factor, etc., of the new products vary somewhat with the purity of the p-chlorostyrene employed in preparing them.

The following examples will illustrate several ways in which the principle of our invention may be applied, but are not to be construed as limiting the same:

Example 1

A mixture of 90 parts by weight of monomeric p-chlorostyrene and 10 parts of allyl crotonate is polymerized by heating at a temperature of about 100°–110° C. for 95 hours. The product is a clear, hard, transparent, thermoplastic resin which is insoluble in acetone and ethanol and capable only of swelling when contacted with benzene and similar aromatic hydrocarbon solvents.

Example 2

A mixture of 90 parts of p-chlorostyrene and 4 parts of trimethallyl phosphate is polymerized by heating at a temperature of about 130° C. for 77½ hours. The polymerized product is a clear, hard, transparent resin which is capable only of swelling in benzene. A test specimen prepared by molding the ground co-polymer at 150° C. is likewise insoluble in benzene and has a tensile strength of about 3600 lbs./sq.ft. and an impact strength of about 0.3 in. lb. In contrast, pure polymerized p-chlorostyrene which is prepared under the same conditions is soluble in benzene and is practically useless for molding purposes because of its brittleness.

Example 3

Monomeric p-chlorostyrene is polymerized to a thick liquid by heating at 125° C. for several hours. A mixture of 95 parts of the partially polymerized p-chlorostyrene so prepared and 5 parts of diallyl maleate is polymerized by heating at about 100°–110° C. for 95 hours. The resinous co-polymer product swells but does not dissolve in benzene and is insoluble in acetone and ethanol.

Example 4

A mixture of 90 parts of p-chlorostyrene and 10 parts of divinyl ether is heated at 130° C. for 77½ hours. The polymeric product is ground in a Wiley mill and vacuum dried at 100° C. for 2.5 hours, and is then compression molded at a temperature of 150° C. The molded test specimen is a clear transparent resin having a tensile strength of about 6200 lbs./sq.in., an impact strength of about 0.5 in. lb., and a Rockwell superficial hardness of about 93.

Example 5

A mixture of 99 parts of p-chlorostyrene and 1 part of the di-cinnamate of 1.4-dioxanediol-2.3 is polymerized by heating at 130° C. for 77½ hours. The product is then ground, dried, and molded as in the preceding example. The molded specimen has a tensile strength of about 4600 lbs./sq. in. and a heat distortion value of about 88° C.

Example 6

A sample of monomeric p-chlorostyrene is polymerized to a thick liquid by heating at 125° C. for several hours. A mixture consisting of 95 parts of the partially polymerized p-chlorostyrene and 5 parts of allyl cinnamate is added dropwise with rapid stirring to a 5 per cent aqueous solution of an emulsifying agent such as albumin, sodium caseinate, etc. The thick, stable emulsion which forms is then polymerized by heating at 90° C. for 144 hours, whereby there is obtained a white, translucent co-polymer which is insoluble in benzene.

Example 7

A mixture of 90 parts of p-chlorostyrene and 10 parts of diallyl phthalate is polymerized by heating at 100°–110° C. for 95 hours, whereby there is formed a hard, colorless resinous co-polymer which is insoluble in benzene.

Also included within the scope of the invention is the formation of co-polymers of higher order in which a portion of the p-chlorostyrene is replaced by another polymerizable material, preferably styrene or a homolog thereof, such as alpha-methyl-styrene. Example 8 below illustrates the preparation of such type of co-polymer.

*Example 8*

A mixture of 50 parts of p-chlorostyrene, 50 parts of styrene, and 1 part of the di-cinnamate of 1.4-dioxanediol-2.3 is polymerized by heating at a temperature of about 130° C. for 77½ hours. The hard, glass-like, polymerized product is then ground and dried, and is compression molded at 150° C. The molded specimen is a transparent, insoluble resin having a tensile strength of about 6,000 lbs./sq. in. and an impact strength of about 0.6 in. lb.

The unsaturated ether and ester co-polymerizing agents used in preparing our new co-polymers needs not necessarily be pure compounds but may be employed as they occur naturally in vegetable oils, etc. Thus, for example, new and useful co-polymers of the present class may be prepared by co-polymerizing tung oil, which consists essentially of elaeostearic glycerides, with p-chlorostyrene according to the invention. Other co-polymerizing agents of the present class are diallyl ether, di-(2-chloroallyl) ether, triallyl phosphate, mono-methallyl diphenyl phosphate, di-(2-ethylallyl) adipate, the di-crotonate of 1.4-dioxanediol-2.3, glycol di-furoate, di-crotyl ether, the diallyl ether of 1.4-dioxanediol-2.3, di-crotyl citraconate, di-(2-chloroallyl) sebacate, 2-chloroallyl furoate, allyl dimethylacrylate, di-(2-chloroallyl) phthalate, tri-ethallyl phosphate, di-methallyl phthalate, di-(2-chloroallyl) malonate, ethylallyl cinnamate, the di-methacrylate of 1.4-dioxanediol-2.3, di-vinyl succinate, etc.

Other modes of applying the principle of our invention may be employed instead of those explained, change being made as regards the method herein disclosed or the materials employed, provided the step or steps stated by any of the following claims be employed or the product claimed in any of the claims be obtained.

We therefore particularly point out and distinctly claim as our invention:

1. The products of the conjoint polymerization of p-chlorostyrene and between about 0.1 and about 25 per cent of its weight of a compound selected from the class consisting of neutral unsaturated esters and ethers containing at least two ethylenic linkages.

2. The products of the conjoint polymerization of p-chlorostyrene and between about 0.1 and about 25 per cent of its weight of a neutral unsaturated ester containing at least two ethylenic linkages.

3. The products of the conjoint polymerization of p-chlorostyrene and between about 0.1 and about 25 per cent of its weight of an unsaturated ether containing at least two ethylenic linkages.

4. The products of the conjoint polymerization of p-chlorostyrene, a polymerizable compound selected from the class consisting of styrene and its polymerizable homologs, and between about 0.1 and about 25 per cent of their total weight of a compound selected from the class consisting of neutral unsaturated esters and ethers containing at least two ethylenic linkages.

5. A co-polymer of p-chlorostyrene prepared by heating at a temperature between about 50° and about 180° C. a mixture of p-chlorostyrene and between about 0.1 and about 25 per cent of its weight of a neutral unsaturated ester containing at least two ethylenic linkages.

6. The products of the conjoint polymerization of p-chlorostyrene and between about 0.1 and about 25 per cent of its weight of allyl crotonate.

7. The products of the conjoint polymerization of p-chlorostyrene and between about 0.1 and about 25 per cent of its weight of di-cinnamate of 1.4-dioxanediol-2.3.

EDGAR C. BRITTON.
WALTER J. LE FEVRE.